United States Patent
Bashor et al.

(10) Patent No.: US 7,346,468 B2
(45) Date of Patent: Mar. 18, 2008

(54) METHOD AND APPARATUS FOR DETECTING HEAT SINK FAULTS

(75) Inventors: Paul Douglas Bashor, Cary, NC (US); Henry Gaines McMillan, Raleigh, NC (US); Challis Llewellyn Purrington, Raleigh, NC (US); Michael Leo Scollard, Raleigh, NC (US); Victor A. Stankevich, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/463,058

(22) Filed: Aug. 8, 2006

(65) Prior Publication Data

US 2008/0040067 A1    Feb. 14, 2008

(51) Int. Cl.
*G01K 17/00* (2006.01)
*G06F 15/00* (2006.01)

(52) U.S. Cl. .................. 702/136; 702/132; 702/185

(58) Field of Classification Search ............... 702/130, 702/132, 136, 185, 85, 99; 236/91 D, 91 F; 700/299, 300
See application file for complete search history.

(56) References Cited

U.S. PATENT DOCUMENTS

| | | | |
|---|---|---|---|
| 4,705,212 A | * | 11/1987 | Miller et al. .................. 236/54 |
| 6,014,612 A | | 1/2000 | Larson et al. |
| 6,711,523 B2 | | 3/2004 | Bechhoefer et al. |
| 6,728,658 B1 | | 4/2004 | Bechhoefer |
| 6,762,907 B2 | * | 7/2004 | Patel et al. .............. 360/97.02 |
| 6,847,917 B2 | | 1/2005 | Bechhoefer |
| 7,104,462 B2 | * | 9/2006 | Shearer ....................... 236/94 |

FOREIGN PATENT DOCUMENTS

JP    9073320 A    3/1997

* cited by examiner

*Primary Examiner*—Bryan Bui
(74) *Attorney, Agent, or Firm*—Cynthia S. Byrd; Streets & Steele; Jeffrey L. Streets (57) ABSTRACT

Detecting, predicting, and diagnosing faults in a cooling system. According to one embodiment, a heat sink is in thermal contact with a heat-generating electronic component. When a temperature differential between the electronic component and the heat sink exceeds a set point, a fault signal is generated. The set point may be empirically or theoretically determined. The set point may be a static set point, or it may be a dynamic set point determined according to real-time operational parameters of the system. The system may be implemented with predictive failure analysis (PFA) to provide a more reliable, efficient, inexpensive, and robust computer system.

17 Claims, 4 Drawing Sheets

METHOD AND APPARATUS FOR DETECTING HEAT SINK FAULTS

BACKGROUND OF THE INVENTION

1. Field of the Invention

The present invention relates to cooling systems for electronic components.

2. Description of the Related Art

It is important to properly cool heat-generating electronic components. In a computer, for example, a cooling system is typically used to keep the CPU at a safe operating temperature. Such a cooling system generally includes a heat sink for dissipating heat from the CPU. Proper installation and functioning of a heat sink can be critical. Modern servers have very little thermal design margin. A faulty or improperly mounted heat sink can, therefore, cause the CPU to overheat. Even when a cooling system is functioning as the designer intended, a CPU may require throttling, which reduces CPU temperature by adding idle cycles to instruction pipelines.

There are numerous opportunities over the course of a computer's useful life for a user to inadvertently cause a heat sink fault. For example, when swapping out a bad CPU, adding a second CPU, or replacing a planar/motherboard, a user risks damaging or improperly reinstalling the heat sink. Even when merely inspecting a heat sink, the user may unintentionally disturb or contaminate the thermal grease, or drop the heat sink and damage its vapor chamber seal, each of which may cause a fault by interfering with proper heat transfer between the CPU and the heat sink.

Present methods and systems are not optimally designed to detect or diagnose overheating problems. For example, some systems measure temperature of the CPU and signal cooling problems only after the CPU has already overheated. Once the CPU has overheated, it may have already failed, potentially resulting in irrecoverable data loss and the expense of replacing the CPU. Additionally, systems that detect an overheating CPU do not typically identify the specific cause, such as failure of the heat sink. Therefore, an improved method of detecting heat sink faults is desired. Preferably, an improved method would signal overheating problems before damage occurs, and identify the cause or at least pinpoint the source of the overheating problems.

SUMMARY OF THE INVENTION

The present invention provides a method comprising sensing a source temperature of a heat-generating electronic component in an electronic system, sensing a sink temperature of a heat sink in thermal communication with the heat-generating electronic component such as a CPU, determining an actual temperature differential between the source temperature and the sink temperature, and generating a fault signal in response to the actual temperature differential exceeding a set point. Optionally, the method may further comprise selecting the set point as a function of real-time values of one or more system parameters.

The present invention also provides a device comprising a source temperature sensor in direct thermal communication with a heat-generating electronic component of the electronic system, a sink temperature sensor in direct thermal communication with a heat sink of an electronic system, wherein the heat sink is in thermal communication with the heat-generating electronic component, and a processor in electronic communication with the sink temperature sensor and the source temperature sensor, wherein the processor is configured for computing a set point as a function of one or more operational parameters of the electronic system, for computing an actual temperature differential as a function of the sink temperature and the source temperature, and for outputting a fault signal in response to the actual temperature differential exceeding the set point. Preferably, the one or more operational parameters are selected from air flow rate, fan speed, inlet air temperature, and combinations thereof. The heat-generating electronic component is preferably a CPU.

Furthermore, the present invention provides a machine-accessible medium containing instructions, which when executed by a machine, cause the machine to perform various operations. The medium includes instructions for sensing a source temperature of a heat-generating electronic component in an electronic system, instructions for sensing a sink temperature of a heat sink in thermal communication with the heat-generating electronic component, instructions for determining an actual temperature differential between the source temperature and the sink temperature, and instructions for outputting a fault signal in response to the actual temperature differential exceeding a set point. Optionally, the set point is a function of one or more of an air flow rate, a fan speed, and an inlet air temperature. The heat-generating electronic component is typically a CPU. In one embodiment, the medium further includes instructions for detecting one or both of an air flow rate and a fan speed, and instructions for selecting the set point as a function of one or both of the air flow rate and the fan speed.

DETAILED DESCRIPTION OF PREFERRED EMBODIMENTS

Systems and methods are disclosed for detecting cooling system faults. Accordingly, overheating of heat-generating components may be detected or anticipated prior to failure of the heat-generating component or other component being cooled. The cause of overheating may also be diagnosed, such as by identifying a specific component of the cooling system that is responsible. When a heat sink is properly mounted, thermal resistance and corresponding heat transfer between a heat source and a heat sink is predictable. If the heat source and heat sink are contained in a predefined environment, the temperature differential between the heat source and the heat sink is predictable. A faulty or improperly mounted heat sink will therefore be indicated by an abnormal temperature differential under relevant operation conditions. The systems and methods according to the invention may be adapted for use with a variety of electronic systems. Embodiments of the invention are particularly well suited to detecting heat sink faults in a computer cooling system. The embodiments of the invention discussed below are not intended, however, to limit the scope of the invention to computer cooling systems.

According to one embodiment of the invention, a cooling system including a heat sink is configured and used in cooperation with Predictive Failure Analysis (PFA) technology. PFA is a technique wherein server components monitor their own health and generate an alert prior to a component failure. If conditions within the component exceed a predetermined range or tolerance, the PFA software may automatically generate an alert. For example, when used with hard disks, the PFA software may monitor read/write errors, fly height changes (the height of the disk head above the platter), and torque amplification control (the amount of power used to keep the drive spinning at a constant speed). The alerts may notify a system administrator, and the system administrator may take corrective measures, such as to hot-swap a component or schedule downtime for the component to be changed or refreshed. Some embodiments of the invention may, therefore, incorporate cooling-system fault-detection into existing PFA functionality.

Embodiments of the invention may pertain to cooling systems used to cool any of a variety of computer components, generally heat-generating components such as a CPU, power source or motherboard. In one embodiment, an apparatus is provided for cooling a computer's CPU. A heat sink is disposed in thermal contact with the CPU. Additional components may be included, such as a fan, a cooling fluid or a vapor chamber about the heat sink, and heat-conducting thermal grease disposed between the CPU and the heat sink.

A temperature sensor is included for sensing a temperature ("sink temperature") of the heat sink. Another sensor is included for sensing a temperature ("source temperature") of a heat-generating electronic component. The temperature sensors may be conveniently calibrated during downtime of the computer. A processor is in electronic and/or wireless communication with the temperature sensors. The processor computes a temperature differential between the electronic component ("source") and the heat sink. The "actual temperature differential" may be computed by subtracting the sink temperature from the source temperature. The computer then compares the actual temperature differential to a set point. The set point is typically a value that indicates a potential overheating problem, and the set point may be referred to as a "critical temperature differential" in that context. If the actual temperature differential exceeds the critical temperature differential, the computer may output a fault signal in response. The fault signal may include an alert communicated to the system administrator via a computer operating system. Furthermore, it should be recognized that the system may include any number of different critical temperature differential set points that could each lead to different alerts or alert levels.

Optionally, the critical temperature differential may be selected according to the largest temperature differential likely to be encountered in normal use without failure of the CPU due to overheating. When the actual temperature differential exceeds the critical temperature differential, the computer outputs the fault signal. In some embodiments, the critical temperature differential is predefined ("static"). In other embodiments, the critical temperature differential may be "dynamic", varying as a function of real-time ("dynamic") parameters, such as fan speed, CPU processing intensity, inlet temperature, ambient air temperature, or other parameters that may vary over time. Furthermore, the critical temperature differential may be empirically or theoretically determined. The critical temperature differential may be reduced by a safety factor, to provide an additional margin of safety.

In another embodiment, the critical temperature differential is empirically determined. For example, a computer may be tested in a desired configuration prior to mass production. The actual temperature differential may be monitored under a variety of experimental parameters, such as by varying intensity of the CPU operation, ambient air temperature, fan speed, experiment duration, and other parameters, while observing changes in the actual temperature differential. The computer may be tested with the heat sink properly installed, wherein data for the various parameters is recorded. The computer may also be tested with intentionally created or known faults or damaged heat sinks, such as by inducing a gap between the heat sink and CPU, damaging the vapor seal, or disturbing the thermal grease. The experimentally controllable parameters may be varied according to a range of values that might be encountered in actual use. A static critical temperature differential for the tested configuration is preferably selected to approximate the largest temperature differential observed during normal use without a fault. The static critical temperature differential may be programmed into a processor of a production computer or embodied in hardware. Alternatively, a dynamic critical temperature differential may be determined by correlating the values of the various operating parameters with the observed temperature differentials. That correlation can be programmed into the processor of the production computer, and subsequently used to compute the dynamic critical temperature differential in the production computer, based on real-time parameters.

In other embodiments, a critical temperature differential may be theoretically computed. For example, a model of the heat sink configuration desired for subsequent use in a production computer may be generated using finite element analysis or computational fluid dynamics. Alternatively, heat transfer within the heat sink may be approximated using heat transfer equations. Again, the desired heat sink configuration may be modeled with both an intact, correctly-installed heat sink, and further modeled with intentionally created faults, such as a gap between the heat sink and the CPU or a discontinuity in the vapor chamber. A static critical temperature differential may be selected, preferably greater than the largest temperature differential encountered under normal use in the absence of a fault, as determined theoretically. Alternatively, real-time parameters may be correlated with actual temperature differentials according to the model.

Another dynamic parameter that may be used to compute a critical temperature differential is the amount of time it takes for the sink temperature to reach a temperature that equals the source temperature at a previous point in time. For example, the source temperature at a first time may be recorded. Next, the sink temperature may be monitored until the sink temperature reaches the value of the source temperature at the first time. The amount of time elapsed is referred to as the time delay or time differential. The critical temperature differential may then be determined based, at least in part, on the time delay. For example, under fault-free conditions, low thermal resistance and efficient heat transfer between source and sink may be expected. Any temperature increase in the CPU would therefore be observed in the heat sink rather quickly, resulting in a relatively small time delay. By contrast, should a fault be present, such as poor seating of the heat sink, larger thermal resistance and correspondingly poor heat transfer may be expected. Accordingly, there would be a correspondingly larger time delay. As with other parameters, the time delay could be correlated with temperature differential through experiment or modeling of the desired cooling system configuration.

Figure 1:
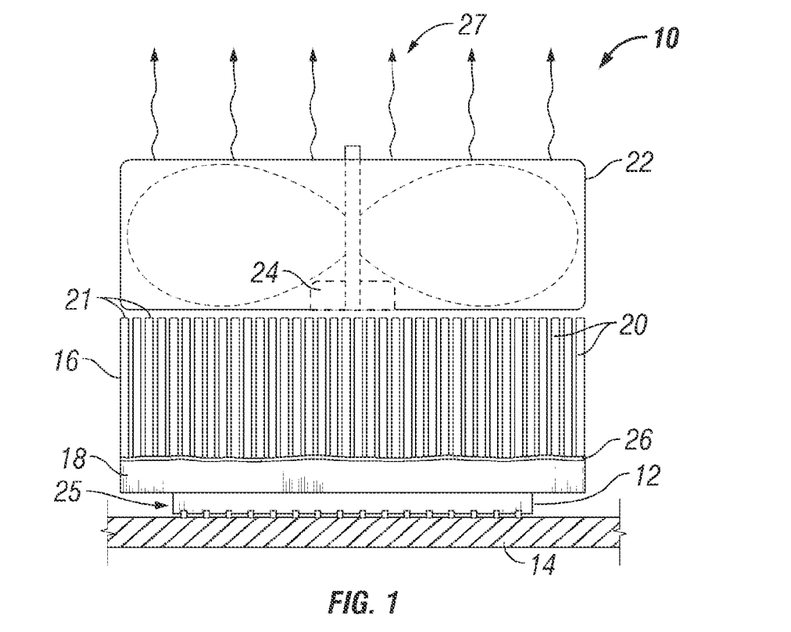
FIG. 1 is a schematic diagram of an embodiment of a CPU cooling system.

FIG. 1 is a schematic diagram of a CPU cooling system embodiment generally indicated at 10. A CPU 12 is mounted to a substrate 14, which may be a circuit board having electrical pathways for communicating between the CPU 12 and other components of a computer. A heat sink 16 is positioned in thermal contact with the CPU 12. The heat sink 16 has cooling fins 20. A vapor chamber 18 is included with the heat sink 16, and thermal grease 26 is provided for ensuring proper heat transfer between the CPU 12 and the heat sink 16. The heat sink 16 conducts heat away from the CPU 12, along the cooling fins 20. The cooling fins 20 are surrounded with ambient air, which carries heat away from the cooling fins 20. A fan 22 is positioned near the heat sink 16 to provide forced convection of heated air away from the heat sink 16, thereby increasing the cooling of the cooling system 10. The fan 22 optionally includes a variable speed motor 24, to selectively increase or decrease the cooling effect contributed by the fan. Air having an "inlet temperature" may enter the cooling system 10 at an upstream location 25. Heated air may exit the cooling system 10 at a downstream location 27. Thus, in the cooling system 10, heat is transferred away from the CPU 12 and passed to ambient air, to cool the CPU 12. It should be recognized that, in other embodiments, the direction of air flow may alternatively be directed generally across the circuit board rather than exhausting the heated air directly away from the circuit board as shown.

Figure 2:
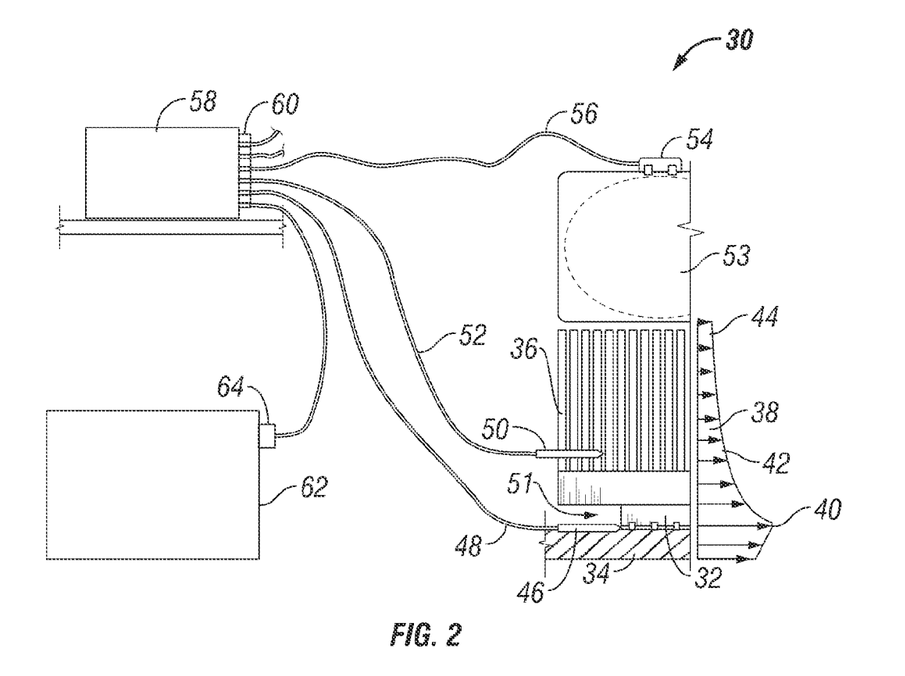
FIG. 2 is a schematic diagram of a "fault-free" CPU cooling system.

FIG. 2 is a schematic diagram of a "fault-free" CPU cooling system generally indicated at 30. A CPU 32 is mounted to a substrate 34. An intact, properly mounted, and otherwise fault-free heat sink 36 is in thermal contact with the CPU 32. A fan 53 is positioned downstream from the heat sink 36. A temperature distribution 38 is drawn to indicate how temperatures may be distributed at one point in time in the cooling system 30. The temperature in the cooling system decreases smoothly and gradually from a location 40 at the CPU 32, to a proximate location 42 at a near end of the heat sink 36, and to a distal location 44 of the heat sink 36.

A temperature sensor 46 having a signal wire 48 is positioned in direct thermal contact with the CPU 32 to sense a source temperature. A temperature sensor 50 having a signal wire 52 is positioned in direct thermal contact with a proximate end of the heat sink 36 to sense a sink temperature. The temperature sensors 46 and 50 may be thermal diodes, temperature probes, or other types of temperature sensors known in the art. An airflow sensor 54 having a signal wire 56 is positioned near the fan 53 at a downstream location of the cooling system 30. A number of types of airflow sensors are known in the art that may be adapted for sensing an airflow rate in the cooling system 30, which is provided largely by the fan 53. A processor 58 includes a terminal 60 for receiving the signal wires 48, 52, 56. The processor 58 is thereby configured to receive signals from the temperature sensors 46, 50 and the airflow sensor 54. In one embodiment, the temperature sensor 46 may be a temperature diode that is integrated into the CPU module itself. Electronic communication with a temperature diode within a CPU may be accomplished via two of the modules IO pins. This would be expected to simplify the implementation.

As discussed previously, the critical temperature differential may be empirically determined by varying parameters of the cooling system 30 and observing the actual temperature differential. Under experimental conditions, a system designer may vary real-time parameters, such as the speed of the fan 53, the inlet temperature at a location 51 by introducing heated or cooled air, and manipulate the power or operating intensity of the CPU 32. The processor 58 or another computer may monitor such variables as the sink temperature, source temperature, air flow rate, and various time delays computed as the time it takes the sink temperature to reach a value of the source temperature at a previous point in time. If the system designer observes no overheating problem with the CPU 32, then the system designer may select a static critical temperature differential that is consistent with the largest temperature differentials observed during testing of the fault-free cooling system 30. Alternatively, the experimental parameters may be correlated with the actual temperature differential for computing a dynamic temperature differential.

The processor 58 computes an actual temperature differential between the CPU 32 and the heat sink 36 using temperature signals received from the source and sink temperature sensors 48, 52. With reference to the temperature distribution 38, the processor 58 may compute the actual temperature differential by subtracting the temperature at the source location 42 from the temperature at the sink location 40. The processor 58 then compares the actual temperature differential with the critical temperature differential. For example, using a previously determined correlation, the processor 58 may compute a dynamic critical temperature differential as a function of real-time parameters such as the variable speed of the fan 55, air flow rate as sensed by the airflow sensor 54, and an inlet temperature. These parameters are continuously monitored by processor 58, so the critical temperature differential will typically vary over time. If the actual temperature differential exceeds the critical temperature differential, the processor 58 will generate an alert to notify the system administrator. User input/output peripherals 62 are optionally included for visually or audibly notifying the system administrator. The input/output peripherals 62 may include a keyboard, pointing device, and a display in communication with the processor 58 or other parts of the computer via interface 64.

Figure 3:
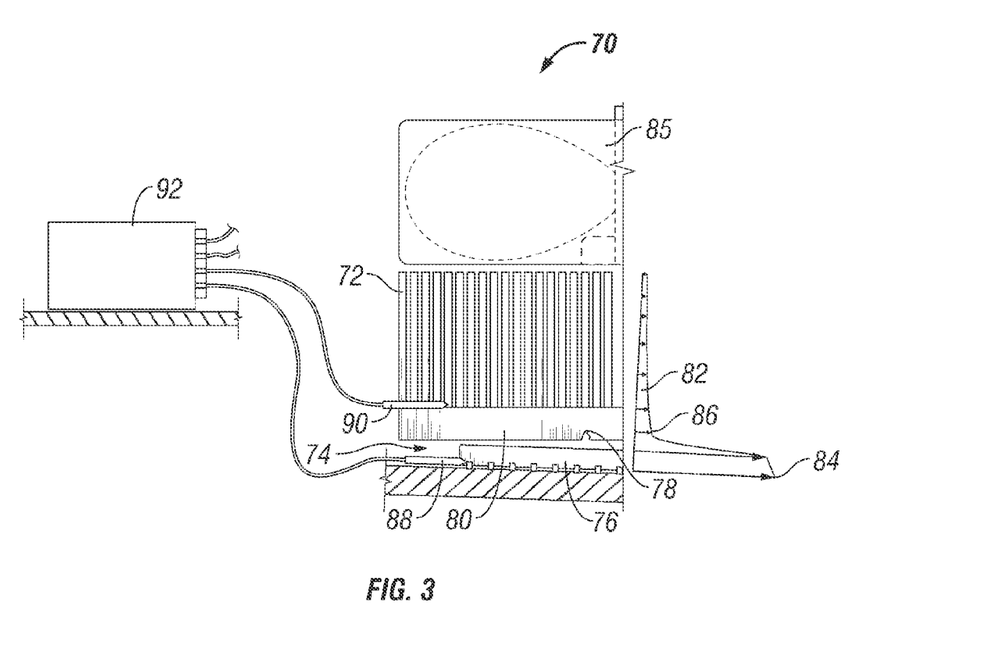
FIG. 3 is a schematic diagram of a "fault-induced" CPU cooling system.

FIG. 3 is a schematic diagram of a "fault-induced" cooling system 70, wherein a known or induced fault exists in the otherwise properly operating cooling system 30 of FIG. 2. In particular, a heat sink 72 is shown improperly mounted, with a gap 74 between the heat sink 72 and a CPU 74. The gap 74 is drawn in an exaggerated fashion, for clarity. Furthermore, there is a break 78 in a vapor chamber 80. Clearly, the cooling system 70 is in bad condition in FIG. 3, and an overheating problem is likely to occur. The fault may have been developed, for example, when a user removed the heat sink 72 for some reason, dropped the heat sink 72 to damage the vapor chamber 80, and then improperly reinstalled the heat sink 72. A system designer may optionally use the fault-induced cooling system 70 of FIG. 3 in determining the static or dynamic critical temperature differential determined in conjunction with the cooling system 30 of FIG. 2.

A temperature distribution 82 confirms the problem with the cooling system 70. The CPU 76 is getting hot, as shown at a source location 84 on the temperature distribution. There is a drastic drop in temperature between the location 84 and the location 86 of the temperature distribution 82. The temperatures throughout the heat sink 72 are fairly low and uniform. The temperature distribution 82 therefore indicates that heat is not being effectively transferred from the CPU 76 to the heat sink 72, due to the gap 74 and/or the damaged vapor chamber 80. A processor 92 receives a source temperature signal from a temperature probe 88 and a sink temperature signal from a temperature probe 90. The resulting actual temperature differential that the processor 92 computes is likely to exceed the critical temperature differential. Thus, the processor 92 may generate a fault signal indicating the problem with the cooling system 70.

Significantly, the processor 92 may intelligently "diagnose" the source of a potential overheating problem. Specifically, by analyzing the actual temperature differential, the cooling system 70 may help pinpoint the heat sink 72 as being in a faulty condition. The system administrator, informed by an alert, may readily focus attention on the condition of the heat sink 72, rather than blindly troubleshooting the problem of an overheating CPU. This minimizes the time and expense involved with maintaining and operating a computer in which the cooling system 70 resides.

Furthermore, the processor 92 of the cooling system 70 may help predict and avoid potential overheating of the CPU 76, because an abnormal value of the actual temperature differential will typically be observed prior to the CPU 76 reaching a dangerous temperature. The system administrator, warned in advance by an alert, may desirably take corrective measures before failure of the CPU 76 or other components. By contrast, a system that merely monitored the temperature of a CPU would be incapable of detecting a problem until after the CPU had already reached a dangerous temperature. Furthermore, the processor 92 may automatically take steps to avoid damage to the CPU, such as by including idle time between CPU operations or increasing fan speed.

In the embodiments of FIGS. 2 and 3, the processor used to analyze temperatures and detect overheating of the cooling system is portrayed as being separate and distinct from the CPU being cooled. In FIG. 3, for example, the processor 92 of the cooling system 70 and the CPU 76 being cooled are illustrated as being two different components. An advantage of a separate processor for analyzing temperatures is that the processor may continue to function even if the CPU were to fail or reversibly malfunction at higher temperatures. However, in other embodiments, a CPU may be "self monitoring," in that the CPU being cooled may receive and analyze temperatures of the cooling system in which it resides. In one embodiment, for example, one or more temperature diodes embedded in the self-monitoring CPU may provide the temperature information required for the CPU to monitor itself. A self-monitoring CPU may therefore require fewer components, such as by eliminating the need for an extra processor and related circuitry. To help ensure the integrity of a cooling system having a self-monitoring CPU, a larger safety factor or other safety precautions could be included, to detect and avert potential overheating substantially prior to reaching temperatures at which the CPU would likely malfunction.

Figure 4:
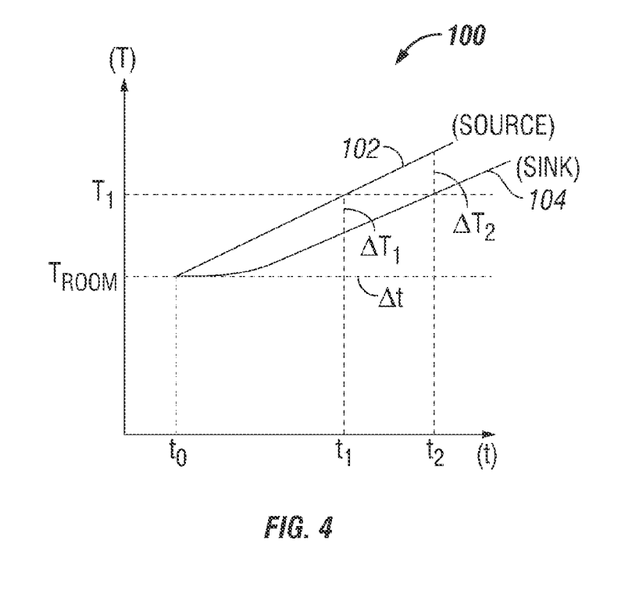
FIG. 4 is a graph plotting a heat source temperature and a generally lagging heat sink temperature in a CPU cooling system as a function of time.

As discussed previously, the actual temperature differential (the difference between the sink temperature and source temperature at an instant in time) may be a function of time lag or delay (the amount of time it takes for the sink temperature to reach a temperature value that approaches or equals the source temperature at a previous point in time). To help illustrate the concept of a time delay, FIG. 4 is a graph 100 plotting the source temperature 102 and the generally lagging sink temperature 104 as a function of time (t). A computer having a CPU or other heat-generating electronic component is turned on at time $t_0$, at which the source temperature 102 and sink temperature 104 are substantially equal (e.g. ambient room temperature). At a latter time $t_1$, the CPU has a source temperature 102 that has heated up to a value of $T_1$, and the sink temperature 104 lags behind the source temperature. The actual temperature differentials (source temperature minus sink temperature) at the instant $t_1$ and at an even later instant $t_2$ are also indicated in the graph. At the later time $t_2$, the sink temperature has reached the value that the source temperature had at $t_1$. The time delay may simply be computed as the difference between the time $t_1$ when the source reaches a given temperature $T_1$ and the later time $t_2$ when the sink reaches the same temperature $T_1$. The time delay and actual temperature differentials may then be correlated, as discussed previously, along with any other parameters, to derive a function relating the critical temperature differential to the time differential. It should be recognized that source and sink temperatures may rise and fall with the operation intensity of the CPU and various other relationships between the two temperatures may be identified and used to analyze heat sink performance and faults. For example, a CPU temperature that runs just below a critical temperature while the CPU is idle or at low operation intensity, can serve as an indication that the CPU should not be run at full operation intensity and a warning signal or alarm may be generated.

It is an important to note that FIG. 4 is provided for illustrating and further describing the time differential, and is not intended to represent typical time/temperature behavior of the source and heat sink. Particularly over extended periods, the temperature profiles for the source and heat sink may vary widely with different systems. The temperature profiles may eventually approach horizontal asymptotes over time. Alternatively, the temperatures may oscillate considerably under the influence of numerous dynamic parameters outlined above, particularly processor intensity. Another possibility is that a system might reach a thermal state wherein the sink temperature is always less than the source temperature. Under such conditions, the time differential may not be as useful or relevant for determining a critical temperature differential or detecting a heat sink fault.

Figure 5:
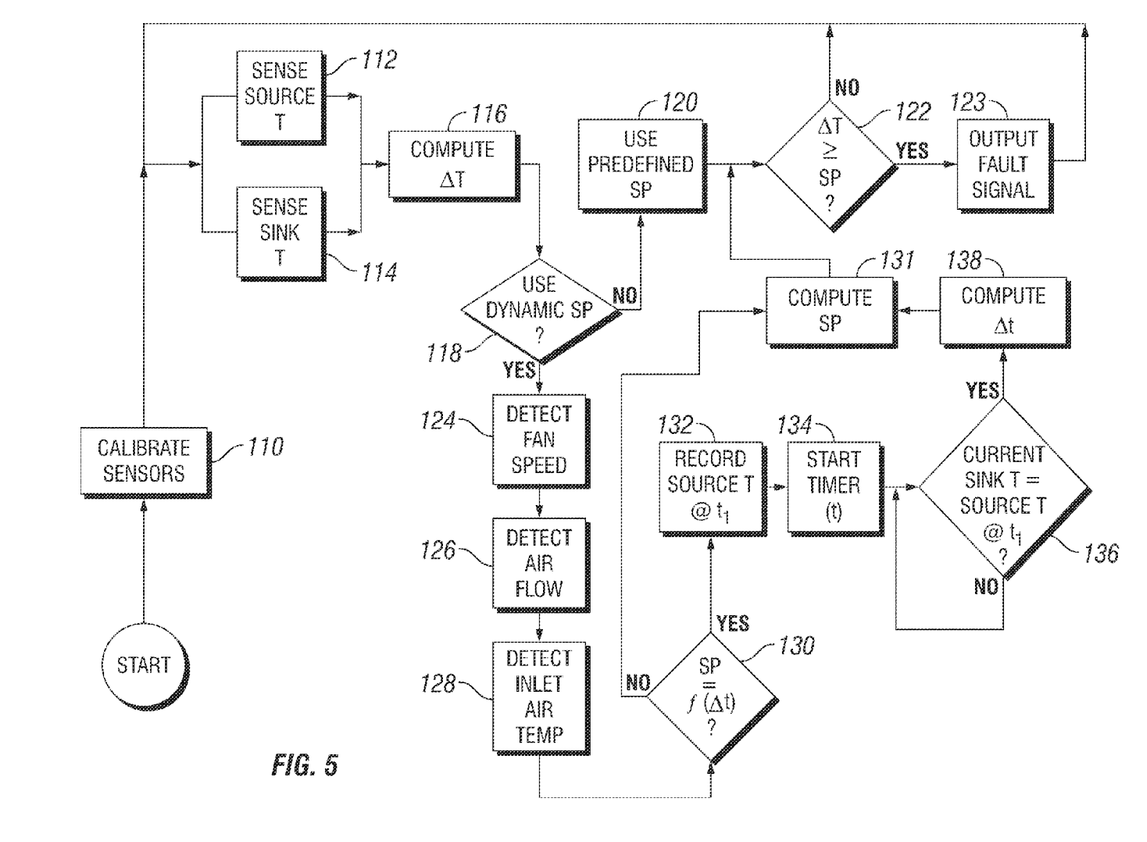
FIG. 5 is a flowchart of a method of detecting, predicting, and diagnosing a fault in a cooling system.

FIG. 5 is a flowchart of a method of detecting, diagnosing, and/or avoiding a fault in a cooling system, as may be exemplified by a computer's CPU cooling system. Temperature sensors are first calibrated in step 110. After turning the computer system on, the temperature sensors detect a source temperature in step 112 and a sink temperature in step 114, which may be performed simultaneously and continuously. An actual temperature differential is computed in step 116. In step 118, the decision to use a static or a dynamic set point (critical temperature differential) is identified, which decision may have been previously specified by a system designer or through user preferences. A static set point, if desired, may simply be selected or defaulted to in step 120. In step 122, if the static set point is selected, then a processor compares the actual temperature differential (determined in step 116) to the static set point (obtained in step 120). If the actual temperature differential ever meets or exceeds the set point critical temperature differential, then a fault signal is output in step 123; otherwise, the process returns to steps 112 and 114 to continue sensing the source and sink temperatures.

If the decision identified in step 118 is to use a dynamic set point, then one or more steps may be performed to factor in various real-time parameters. In optional step 124, the cooling system detects a fan speed. In optional step 126, the cooling system detects an air flow rate. In optional step 128, the cooling system detects an inlet air temperature. In step 130, the decision is made whether to include a time differential in the computation of the critical temperature differential. If the time differential is not included, the dynamic set point may be selected or computed directly in step 131, according to the parameters optionally detected in steps 124, 126, 128. In step 122, the temperature differential (step 116) is compared to the dynamic set point (step 131) to determine if the actual temperature differential exceeds the set point. If the actual temperature exceeds the set point, then a fault signal is output in step 123; before the process is generally repeated, beginning with continuing to monitor the source temperature and the sink temperature.

If, in step 130, the decision is/was made to include the time delay parameter in computing the dynamic set point, then one or more additional steps may be performed, as follows. In step 132, a first time $t_1$ is noted, at which time the source temperature is recorded. A "timer" is begun in step 134 to keep track of the time elapsed since the first time ($t_1$). In step 136, the current sink temperature is compared with the value of the source temperature at the first time $t_1$, as recorded in step 132. If the two are substantially equal, then the time delay is computed in step 138 as the time elapsed ($t_2$-$t_1$). The set point is computed in step 131 as a function of the time differential (computed in step 138), the optional fan speed (step 124), the optional airflow rate (step 126), and the optional inlet air temperature (step 128). In step 122, the actual temperature differential (determined in step 116) is compared to the dynamic set point (computed in step 131) to determine if the actual temperature differential exceeds the set point. If so, a fault signal or alarm is output in step 123 before the process continues with monitoring the source temperature and the sink temperature in steps 112, 114.

It should be recognized that the invention may take the form of an entirely hardware embodiment, an entirely software embodiment, or an embodiment containing both hardware and software elements. In particular embodiments, including those embodiments of methods, the invention may be implemented in software, which includes but is not limited to firmware, resident software and microcode.

Furthermore, the invention can take the form of a computer program product accessible from a computer-readable medium providing program code for use by or in connection with a computer or any instruction execution system. For the purposes of this description, a computer-usable or computer readable medium can be any apparatus that can contain, store, communicate, propagate or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W), and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 6:
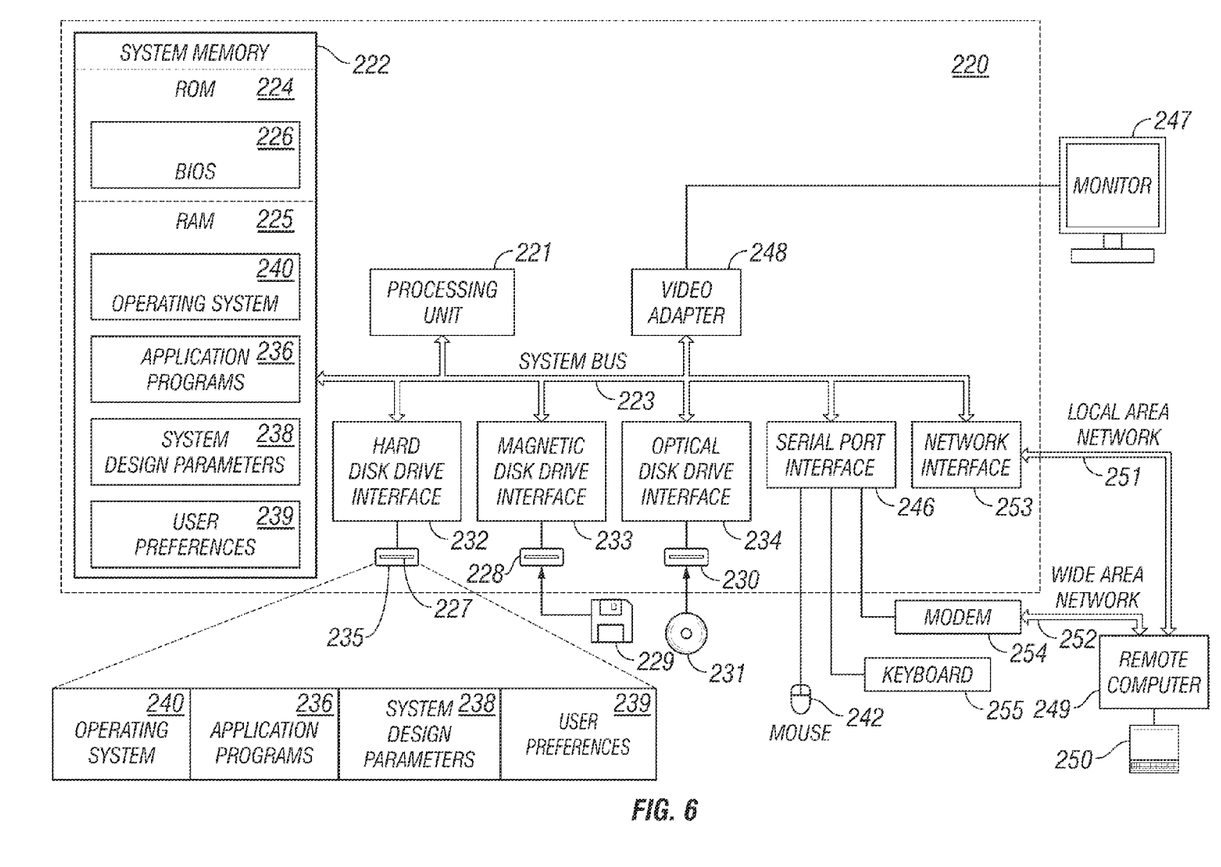
FIG. 6 is a schematic diagram of a computer that may be configured for detecting and diagnosing a heat sink fault.

To illustrate, FIG. 6 is a schematic diagram of a computer system generally indicated at 220 that may be configured for detecting, predicting, and diagnosing a cooling system fault according to an embodiment of the invention. The computer system 220 may be a general-purpose computing device in the form of a conventional computer system 220. Generally, computer system 220 includes a processing unit 221, a system memory 222, and a system bus 223 that couples various system components, including the system memory 222 to processing unit 221. System bus 223 may be any of several types of bus structures including a memory bus or memory controller, a peripheral bus, and a local bus using any of a variety of bus architectures. The system memory includes a read only memory (ROM) 224 and random access memory (RAM) 225. A basic input/output system (BIOS) 226, containing the basic routines that help to transfer information between elements within computer system 220, such as during start-up, is stored in ROM 224.

Computer system 220 further includes a hard disk drive 235 for reading from and writing to a hard disk 227, a magnetic disk drive 228 for reading from or writing to a removable magnetic disk 229, and an optical disk drive 230 for reading from or writing to a removable optical disk 231 such as a CD-R, CD-RW, DV-R, or DV-RW. Hard disk drive 235, magnetic disk drive 228, and optical disk drive 230 are connected to system bus 223 by a hard disk drive interface 232, a magnetic disk drive interface 233, and an optical disk drive interface 234, respectively. Although the exemplary environment described herein employs hard disk 227, removable magnetic disk 229, and removable optical disk 231, it should be appreciated by those skilled in the art that other types of computer readable media which can store data that is accessible by a computer, such as magnetic cassettes, flash memory cards, digital video disks, Bernoulli cartridges, RAMs, ROMs, USB Drives, and the like, may also be used in the exemplary operating environment. The drives and their associated computer readable media provide non-volatile storage of computer-executable instructions, data structures, program modules, and other data for computer system 220. For example, the operating system 240 and application programs 236 may be stored in the RAM 225 and/or hard disk 227 of the computer system 220.

A user may enter commands and information into computer system 220 through input devices, such as a keyboard 255 and a mouse 242. Other input devices (not shown) may include a microphone, joystick, game pad, touch pad, satellite dish, scanner, or the like. These and other input devices are often connected to processing unit 222 through a USB (universal serial bus) 246 that is coupled to the system bus 223, but may be connected by other interfaces, such as a serial port interface, a parallel port, game port, or the like. A display device 247 may also be connected to system bus 223 via an interface, such as a video adapter 248. In addition to the monitor, personal computers typically include other peripheral output devices (not shown), such as speakers and printers.

The computer system 220 may operate in a networked environment using logical connections to one or more remote computers 249. Remote computer 249 may be another personal computer, a server, a client, a router, a network PC, a peer device, a mainframe, a personal digital assistant, an internet-connected mobile telephone or other common network node. While a remote computer 249 typically includes many or all of the elements described above relative to the computer system 220, only a memory storage device 250 has been illustrated in FIG. 6. The logical connections depicted in the figure include a local area network (LAN) 251 and a wide area network (WAN) 252. Such networking environments are commonplace in offices, enterprise-wide computer networks, intranets, and the internet.

When used in a LAN networking environment, the computer system 220 is often connected to the local area network 251 through a network interface or adapter 253. When used in a WAN networking environment, the computer system 220 typically includes a modem 254 or other means for establishing high-speed communications over WAN 252, such as the internet Modem 254, which may be internal or external, is connected to system bus 223 via USB interface 246. In a networked environment, program modules illustrated relative to computer system 220, or portions thereof, may be stored in the remote memory storage device 250. It will be appreciated that the network connections shown are exemplary and other means of establishing a communications link between the computers may be used.

Program modules may be stored on hard disk 227, optical disk 231, ROM 224, RAM 225, or even magnetic disk 229. The program modules may include portions of an operating system 240, application programs 236, or the like. A system design database 238 may be included, which may contain parameters and procedures for monitoring within the cooling system. A user preferences database 239 may also be included, which may contain parameters and procedures for monitoring within the cooling system, such as a static setpoint for the critical temperature differential or operating parameters to be considered in determining a dynamic setpoint, as designated by an end user of the computer system 220.

Aspects of the present invention may be implemented in the form of application program 236. The application program 236 generally comprises computer-executable instructions for detecting, predicting, and diagnosing a cooling system fault. The application program 236 may be informed by or otherwise associated with the system design database 238 and/or user preferences database 239.

The terms "comprising," "including," and "having," as used in the claims and specification herein, shall be considered as indicating an open group that may include other elements not specified. The terms "a," "an," and the singular forms of words shall be taken to include the plural form of the same words, such that the terms mean that one or more of something is provided. The term "one" or "single" may be used to indicate that one and only one of something is intended. Similarly, other specific integer values, such as "two," may be used when a specific number of things is intended. The terms "preferably," "preferred," "prefer," "optionally," "may," and similar terms are used to indicate that an item, condition or step being referred to is an optional (not required) feature of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method comprising:
    sensing a source temperature of a heat-generating electronic component in an electronic system;
    sensing a sink temperature of a heat sink in thermal communication with the heat-generating electronic component;
    determining an actual temperature differential between the source temperature and the sink temperature; and
    outputting a fault signal in response to the actual temperature differential exceeding a set point indicative of a heat sink fault.

2. The method of claim 1, further comprising selecting the set point as a function of real-time values of one or more system parameters.

3. The method of claim 1, further comprising:
    recording the source temperature at a first time;
    computing a time interval between the first time and a second time wherein the sink temperature is substantially equal to the source temperature at the first time; and
    selecting the set point as a function of the time interval.

4. The method of claim 1, further comprising:
    detecting one or both of an air flow rate and a fan speed; and
    selecting the set point as a function of one or both of the air flow rate and the fan speed.

5. The method of claim 1, further comprising:
    detecting an inlet air temperature upstream from the heat sink; and
    computing the set point as a function of the inlet air temperature.

6. The method of claim 1, wherein the heat-generating electronic component comprises a CPU.

7. The method of claim 1, further comprising calibrating one or more temperature sensors for sensing one or both of the source temperature and the sink temperature prior to powering on the electronic system.

8. A device, comprising:
    a source temperature sensor in direct thermal communication with a heat-generating electronic component of the electronic system;
    a sink temperature sensor in direct thermal communication with a heat sink of an electronic system, wherein the heat sink is in thermal communication with the heat-generating electronic component;
    a processor in electronic communication with the sink temperature sensor and the source temperature sensor, the processor configured for computing a set point indicative of a heat sink fault as a function of one or more operational parameters of the electronic system, computing an actual temperature differential as a function of the sink temperature and the source temperature, and for outputting a fault signal in response to the actual temperature differential exceeding the set point.

9. The device of claim 8, wherein the computer is configured for recording the source temperature at a first time, computing a time interval between the first time and a second time wherein the sink temperature is substantially equal to the source temperature at the first time, and selecting the set point as a function of at least the time interval.

10. The device of claim 8, wherein the one or more operational parameters are selected from air flow rate, fan speed, inlet air temperature, and combinations thereof.

11. The device of claim 8, wherein the heat-generating electronic component comprises a CPU.

12. A machine-accessible medium containing instructions, which when executed by a machine, cause the machine to perform operations, comprising:
 instructions for sensing a source temperature of a heat-generating electronic component in an electronic system;
 instructions for sensing a sink temperature of a heat sink in thermal communication with the heat-generating electronic component;
 instructions for determining an actual temperature differential between the source temperature and the sink temperature; and
 instructions for outputting a fault signal in response to the actual temperature differential exceeding a set point indicative of a heat sink fault.

13. The machine-accessible medium of claim 12, further comprising:
 instructions for selecting the set point as a function of real-time values of at least one of the one or more system parameters;
 instructions for recording the source temperature at a first time;
 instructions for computing a time interval between the first time and a second time wherein the sink temperature is substantially equal to the source temperature at the first time; and
 instructions for selecting the set point as a function of the time interval.

14. The machine-accessible medium of claim 12, wherein the operations further comprise:
 instructions for detecting one or both of an air flow rate and a fan speed; and
 instructions for selecting the set point as a function of one or both of the air flow rate and the fan speed.

15. The machine-accessible medium of claim 12, wherein the operations further comprise:
 instructions for detecting an inlet air temperature upstream from the heat sink; and
 instructions for computing the set point as a function of the inlet air temperature.

16. The machine-accessible medium of claim 12, wherein the set point is a function of one or more of an air flow rate, a fan speed, and an inlet air temperature.

17. The machine-accessible medium of claim 12, wherein the heat-generating electronic component comprises a CPU.

\* \* \* \* \*